United States Patent
Sakamoto et al.

(10) Patent No.: US 12,019,267 B2
(45) Date of Patent: Jun. 25, 2024

(54) MULTICORE OPTICAL FIBER AND DESIGN METHOD

(71) Applicant: NIPPON TELEGRAPH AND TELEPHONE CORPORATION, Tokyo (JP)

(72) Inventors: Taiji Sakamoto, Musashino (JP); Kazuhide Nakajima, Musashino (JP); Takashi Matsui, Musashino (JP); Kyozo Tsujikawa, Musashino (JP); Kunimasa Saitoh, Sapporo (JP); Takeshi Fujisawa, Sapporo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 242 days.

(21) Appl. No.: 17/627,866

(22) PCT Filed: Jul. 21, 2020

(86) PCT No.: PCT/JP2020/028205
§ 371 (c)(1),
(2) Date: Jan. 18, 2022

(87) PCT Pub. No.: WO2021/015186
PCT Pub. Date: Jan. 28, 2021

(65) Prior Publication Data
US 2022/0276430 A1    Sep. 1, 2022

(30) Foreign Application Priority Data
Jul. 22, 2019  (JP) .................... 2019-134908

(51) Int. Cl.
*G02B 6/02*     (2006.01)
*G02B 27/00*    (2006.01)

(52) U.S. Cl.
CPC ..... *G02B 6/02042* (2013.01); *G02B 27/0012* (2013.01)

(58) Field of Classification Search
CPC .................................................. G02B 6/02042
(Continued)

(56) References Cited

U.S. PATENT DOCUMENTS

2011/0206330 A1*  8/2011  Sasaoka ............... G02B 6/105
                                                       385/126

FOREIGN PATENT DOCUMENTS

CN    208969268 U    6/2019
JP    2013-097172 A  5/2013

OTHER PUBLICATIONS

"Scaling Rules for Thin-Film Optical Waveguides" by Kogelnik et al, Applied Optics, vol. 13, No. 8, pp. 1857-1862 (Year: 1974).*

(Continued)

*Primary Examiner* — Robert Tavlykaev
(74) *Attorney, Agent, or Firm* — Harness, Dickey & Pierce, P.L.C.

(57) ABSTRACT

An object of the present invention is to provide a multi-core optical fiber that can prevent an increase in bending loss even when a distance between a peripheral core and a cladding boundary is decreased, and can improve a bending loss characteristic in a state where an influence on a cutoff wavelength and a mode field diameter is small, and a design method thereof.

The multi-core optical fiber according to the present invention is an optical fiber in which two or more core regions are arranged in a cladding region having a refractive index lower than a refractive index of the core at a minimum core interval, a ring-shaped low refractive index region surrounding the core and having a refractive index lower than the refractive index of the cladding region is provided, a bend- (Continued)

(a)

(b)

ing loss after the provision of the ring-shaped low refractive index region is reduced as compared with a characteristic in a case where the ring-shaped low refractive index region is not provided, and at the same time, a change in mode field diameter after the provision of the ring-shaped low refractive index region is not changed as compared with a characteristic in a case where the ring-shaped low refractive index region is not provided.

2 Claims, 11 Drawing Sheets

(58) Field of Classification Search
USPC .......................................................... 385/126
See application file for complete search history.

(56) References Cited

OTHER PUBLICATIONS

H. Takara et al., "1.01-Pb/s (12 SDM/222 WDM/456 Gb/s) Crosstalk-managed Transmission with 91.4-b/s/Hz Aggregate Spectral Efficiency", in ECOC2012, paper Th.3.C.1 (2012).

T. Sakamoto et al., "Differential Mode Delay Managed Transmission Line for WDM-MIMO System Using Multi-Step Index Fiber", J. Lightwave Technol., vol. 30, pp. 2783-2787 (2012).
Y. Sasaki et al., "Large-effective-area uncoupled few-mode multi-core fiber", ECOC2012, paper Tu.1.F.3 (2012).
T. Ohara et al., "Over-1000-Channel Ultradense WDM Transmission with Supercontinuum Multicarrier Source", IEEE J. Lightw. Technol., vol. 24, pp. 2311-2317 (2006).
K. Imamura et al., "Investigation on multi-core fibers with large Aeff and low micro bending loss", Opt. Express, vol. 19, pp. 10595-10603 (2011).
T. Sakamoto, T. Matsui, K. Saitoh, S. Saitoh, K. Takenaga, T. Mizuno, Y. Abe, K. Shibahara, Y. Tobita, S. Matsuo, K. Aikawa, S. Aozasa, K. Nakajima, Y. Miyamoto, "Low-Loss and Low-DMD 6-Mode 19-Core Fiber with Cladding Diameter of Less Than 250 μm", J. Lightwave Technol. 35, 443-449 (2017).
T. Sakamoto, T. Mori, M. Wada, T. Yamamoto, F. Yamamoto, and K. Nakajima, "Fiber Twisting- and Bending-Induced Adiabatic/Nonadiabatic Super-Mode Transition in Coupled Multicore Fiber", J. Lightwave Technol., 34, 1228-1237 (2016).
ITU-T Recommendation G.652, Nov. 2016.

* cited by examiner (a)

(b)

TRIANGLE LATTICE SHAPE   RING SHAPE   SQUARE LATTICE SHAPE

MULTICORE OPTICAL FIBER AND DESIGN METHOD

CROSS-REFERENCE TO RELATED APPLICATIONS

This application is a 371 U.S. National Phase of International Application No. PCT/JP2020/028205, filed on Jul. 21, 2020, which claims priority to Japanese Application No. 2019-134908, file on Jul. 22, 2019. The entire disclosures of the above applications are incorporated herein by reference.

TECHNICAL FIELD

The present disclosure relates to a multi-core optical fiber and a design method thereof.

BACKGROUND ART

In an optical fiber communication system, a transmission capacity is limited by a non-linear effect generated in an optical fiber and a fiber fuse. In order to alleviate these limitations, spatial multiplexing techniques such as parallel transmission (see, for example, Non Patent Literature 1) using a multi-core optical fiber in which one optical fiber includes a plurality of cores, mode multiplexing transmission (see, for example, Non Patent Literature 2) using a multi-mode fiber in which a plurality of propagation modes exist in a core, and a few-mode multi-core optical fiber (see, for example, Non Patent Literature 3) in which multi-core and mode multiplexing are combined have been studied.

CITATION LIST

Non Patent Literature

Non Patent Literature 1: H. Takara et al., "1.01 Pb/s (12 SDM/222 WDM/456 Gb/s) Crosstalk-managed Transmission with 91.4-b/s/Hz Aggregate Spectral Efficiency", in ECOC 2012, paper Th.3.C.1 (2012)

Non Patent Literature 2: T. Sakamoto et al., "Differential Mode Delay Managed Transmission Line for WDM-MIMO System Using Multi-Step Index Fiber", J. Lightwave Technol. vol. 30, pp. 2783-2787 (2012)

Non Patent Literature 3: Y. Sasaki et al., "Large-effective-area uncoupled few-mode multi-core fiber", ECOC 2012, paper Tu.1.F.3 (2012).

Non Patent Literature 4: T. Ohara et al., "Over-1000-Channel Ultradense WDM Transmission with Supercontinuum Multicarrier Source", IEEE J. Lightw. Technol., vol. 24, pp. 2311-2317 (2006)

Non Patent Literature 5: K. Imamura et al., "Investigation on multi-core fibers with large Aeff and low micro bending loss", Opt. Express, vol. 19, pp. 10595-10603 (2011) Non Patent Literature 6: T. Sakamoto, T. Matsui, K. Saitoh, S. Saitoh, K. Takenaga, T. Mizuno, Y. Abe, K. Shibahara, Y. Tobita, S. Matsuo, K. Aikawa, S. Aozasa, K. Nakajima, Y. Miyamoto, "Low-Loss and Low-DMD 6-Mode 19-Core Fiber with Cladding Diameter of Less Than 250 μm", J. Lightwave Technol. 35, 443-449 (2017)

Non Patent Literature 7: T. Sakamoto, T. Mori, M. Wada, T. Yamamoto, F. Yamamoto, and K. Nakajima, "Fiber Twisting- and Bending-Induced Adiabatic/Nonadiabatic Super-Mode Transition in Coupled Multicore Fiber", J. Lightwave Technol. 34, 1228-1237 (2016)

Non Patent Literature 8: ITU-T Recommendation G.652

SUMMARY OF INVENTION

Technical Problem

In transmission using a multi-core optical fiber, signal quality deteriorates when crosstalk between cores occurs, and thus it is necessary to separate the cores from each other by a certain distance or more in order to suppress the crosstalk. In general, in order to ensure sufficient transmission quality in an optical communication system, it is desirable to set a power penalty to 1 dB or less, and for this purpose, the crosstalk needs to be −26 dB or less as described in Non Patent Literatures 1 and 4. Such a fiber is referred to as an uncoupled multi-core optical fiber.

Meanwhile, when the distance between the cores is increased in order to sufficiently reduce the inter-core crosstalk, there is a problem that a distance between the core arranged on the outer side and a cladding boundary is decreased in a case of a constant cladding outer diameter, and a bending loss is thus increased (see, for example, Non Patent Literature 5).

In addition, in order to reduce the bending loss of each core, a trench-assisted structure in which a low refractive index region surrounds the periphery of each core as described in Non Patent Literature 6 has been studied for refractive index distribution of each core, however, as described in Non Patent Literature 6, there is a problem that a cutoff wavelength of the core arranged on the center side is increased due to an influence of the low refractive index region of the core arranged in the periphery.

Meanwhile, as described in Non Patent Literature 7, a fiber type called a coupled multi-core optical fiber having whose inter-core crosstalk is large has been studied, and when a multiple-input multiple-output (MIMO) technology is used, it is possible to compensate for the crosstalk at a reception side, and it is possible to reduce the distance between the cores and to make the power penalty less than 1 dB by signal processing even when the crosstalk is −26 dB or more, thereby improving space utilization efficiency.

Also in such a coupled multi-core optical fiber, in order to reduce the bending loss described above, the distance between the core arranged on the outer side and the cladding boundary needs to be a predetermined value or more. In addition, when a core refractive index having trench-type refractive index distribution is adopted in order to reduce the bending loss, a higher-order mode guiding the central core is propagated by the low refractive index region of the peripheral core, and the same problem that the cutoff wavelength is increased as that of the uncoupled multi-core optical fiber described above occurs.

Therefore, in order to solve the above problems, an object of the present invention is to provide a multi-core optical fiber that can prevent an increase in bending loss even when a distance between a peripheral core and a cladding boundary is decreased, and can improve a bending loss characteristic in a state where an influence on a cutoff wavelength and a mode field diameter is small, and a design method thereof.

Solution to Problem

In order to achieve the above object, a multi-core optical fiber according to the present invention has a structure including a ring-shaped low refractive index region surrounding a plurality of cores.

Specifically, the multi-core optical fiber according to the present invention includes a ring-shaped common trench having a refractive index lower than a refractive index of a cladding and surrounding all cores in a cross section, in which a minimum value E (μm) from a boundary between the core and the cladding to an inner diameter of the common trench satisfies Formula C1:

[Formula C1]

$$E > -0.35542 - 35.576\Delta_{-} - 93.643\Delta_{-}^{2} - 86.407\Delta_{-}^{3} \quad (C1)$$

where $\Delta_{-}$ is a relative index difference (%) of the common trench with respect to the cladding.

Further, the common trench of the multi-core optical fiber according to the present invention has an inner diameter C (μm) and a ring width W (μm) that satisfy a trench volume x of Formula C2:

[Formula C2]

$$\alpha_B \times 10^{\frac{\Delta\alpha_B}{10}} < \alpha_B 0$$

$$\lambda_{cc} + \Delta\lambda + \lambda_{cc0}$$

$$\Delta\alpha_B = 0.043771x - 1.3385 \times 10^{-5}x^2 + b \quad \text{(When } x < 1250 \text{ μm}^2\%\text{)} \quad (C2)$$

$$\Delta\alpha_B = 18.114 + 0.012932x + b \quad \text{(When } x \geq 1250 \text{ μm}^2\%\text{)}$$

$$\Delta\lambda = 0.10453x - 0.00010793x^2$$

$$b = 45.3 - 0.56\alpha_B$$

where x (μm²%) is a product of an area of the common trench in the cross section of the multi-core optical fiber and an absolute value $\Delta_{-}$ of the relative index difference of the common trench, $\alpha_{B0}$ is a desired bending loss (dB/100 turns) of the core, $\lambda_{cc0}$ is a desired cutoff wavelength (nm) of the core, $\alpha_B$ is a bending loss (dB/100 turns) of the core in a case where there is no common trench, and $\lambda_{cc}$ is a desired cutoff wavelength (nm) of the core in a case where there is no common trench.

Further, a design method according to the present invention is a design method of a multi-core optical fiber, in which
the multi-core optical fiber includes a ring-shaped common trench having a refractive index lower than a refractive index of a cladding and surrounding all cores in a cross section, and a minimum value E (μm) from a boundary between the core and the cladding to an inner diameter of the common trench is designed to satisfy Formula C1.

In addition, in the design method according to the present invention, an inner diameter C (μm) and a ring width W (μm) of the common trench are designed to satisfy a trench volume x of Formula C2.

As the multi-core optical fiber has the above-described structure, the distance E between the peripheral core and the cladding boundary can be reduced, and a larger number of cores can be arranged in a multi-core optical fiber having a smaller cladding diameter or for a predetermined cladding diameter (for example, 125 μm).

By providing the common trench which is the low refractive index region, an effect of improving the bending loss characteristic is obtained without making the cutoff wavelength of the core present in the central region longer than the cutoff wavelength of the peripheral core. In addition, by providing the common trench which is the low refractive index region, an effect of reducing the bending loss is obtained without affecting the mode field diameter.

Advantageous Effects of Invention

The present invention can provide the multi-core optical fiber that can prevent an increase in bending loss even when the distance between the peripheral core and the cladding boundary is decreased, and can improve the bending loss characteristic in a state where the influence on the cutoff wavelength and the mode field diameter is small, and the design method thereof.

BRIEF DESCRIPTION OF DRAWINGS

FIG. 3 illustrates a result of calculation of a bending loss characteristic with respect to a relative index difference of the common trench when a trench volume is constant.

FIG. 4 illustrates a result of calculation of a bending loss improvement amount with respect to the trench volume.

FIG. 5 illustrates a result of calculation of the amount of change in cutoff wavelength with respect to the trench volume.

FIG. 6 is a diagram for describing a relationship between the relative index difference of the common trench and a minimum distance E from the center of a core to an inner diameter of the common trench in a case where 1% of a change in mode field diameter (MFD) caused by the provision of the common trench is allowed.

FIG. 8 is a diagram for describing the bending loss improvement amount with respect to the trench volume.

FIG. 9 is a diagram for describing a relationship between a bending loss of the core in a case where there is no common trench and the bending loss improvement amount in a case where the common trench is provided.

FIG. 10 is a diagram for describing a relationship between the bending loss of the core in a case where there is no common trench and the amount of change in cutoff wavelength caused by the provision of the common trench.

DESCRIPTION OF EMBODIMENTS

Embodiments of the present invention will be described with reference to the accompanying drawings. The embodiments described below are examples of the present invention, and the present invention is not limited to the following embodiments. Note that components having the same reference signs in the present specification and the drawings indicate the same components. Unless otherwise specified, the term "bending loss" means a loss when a bending radius is 30 mm.

Embodiment 1

Figure 1:
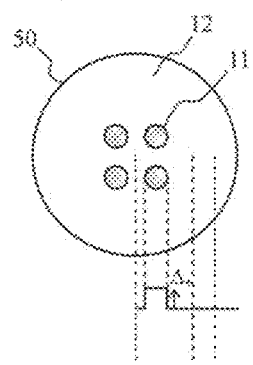
FIG. 1(a) is a schematic view illustrating a cross-sectional structure of a multi-core optical fiber.
FIG. 1(b) is a schematic view illustrating a cross-sectional structure of a multi-core optical fiber according to the present invention.
Figure 1:
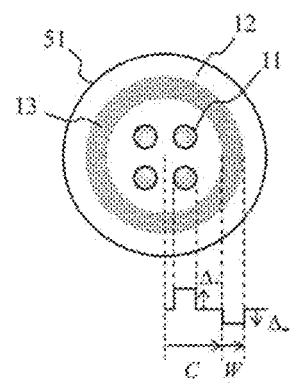

FIG. 1 is schematic diagrams illustrating cross-sectional structures of multi-core optical fibers. FIG. 1(*a*) illustrates a structure of a conventional multi-core optical fiber 50. Two or more cores 11 exist in a region of a cladding 12. Note that, in FIG. 1(*a*), a refractive index profile of the core is a step type, but arbitrary refractive index distribution may be used, and a gray type, a W type in which the periphery of each core is surrounded by a low refractive index region, or a trench-assisted type may be used.

FIG. 1(*b*) is a cross-sectional view of a multi-core optical fiber 51 according to the present embodiment. A plurality of cores 11 in a cladding 12 are surrounded by a ring-shaped low refractive index region. Hereinafter, the low refractive index region is referred to as a common trench 13. The common trench 13 has a ring shape, and a distance (inner diameter) from the center of the cladding 12 to an inner side of the ring is C, and a width of the common trench 13 is W. In addition, a radius of the core 11 is a, a relative index difference of the core 11 with respect to the cladding 12 is $\Delta_-$, and a relative index difference of the common trench 13 with respect to the cladding 12 is $\Delta_-$.

Figure 11:
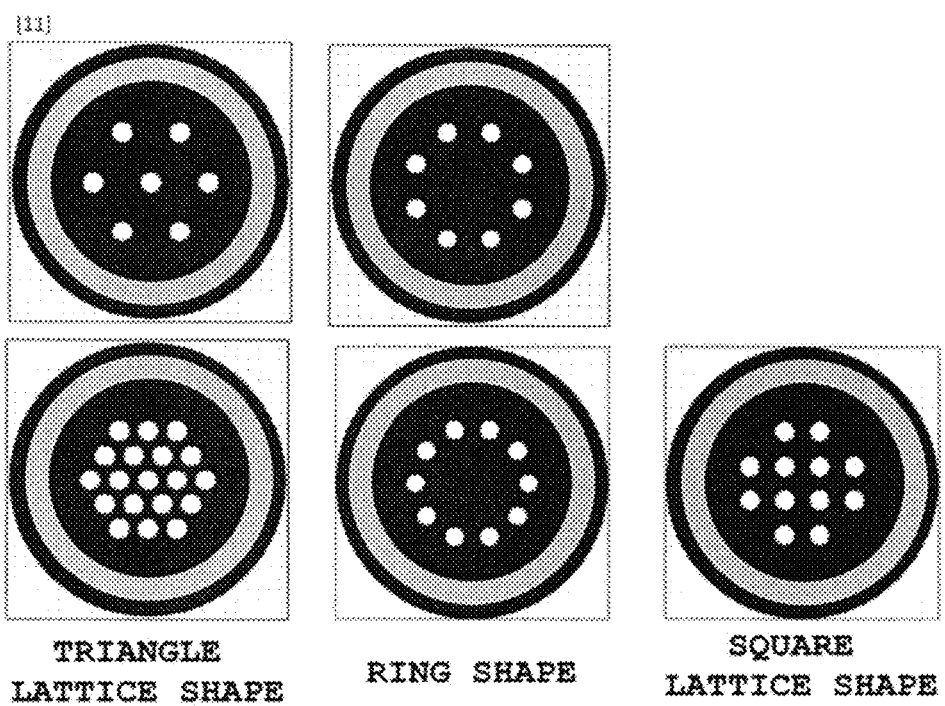
FIG. 11 is a diagram for describing a multi-core structure other than a 4-core structure of the multi-core optical fiber according to the present invention.

Note that the present invention is also applicable to a multi-core structure other than the 4-core structure illustrated in FIG. 1, and for example, a low refractive index region surrounding all cores in various core arrangements as illustrated in FIG. 11 may be provided.

Figure 2:
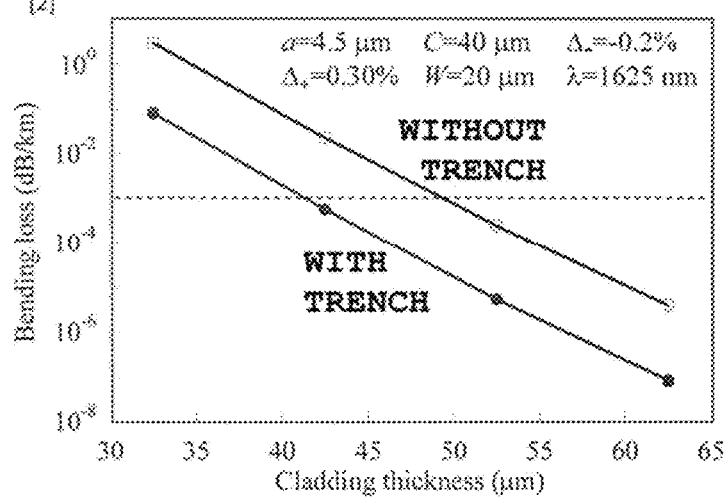
FIG. 2 illustrates a result of calculation of a change in bending loss depending on the presence or absence of a common trench in the multi-core optical fiber. A bending radius is 140 mm.

FIG. 2 illustrates a result of calculation of dependence of the bending loss on a cladding thickness at a wavelength of 1625 nm when a=4.5 μm, $\Delta_+$=0.3%, C=40 μm, W=20 μm, $\Delta_-$=−0.2%, and a bending radius=140 mm. The cladding thickness refers to the shortest distance from the center of each core to the outermost circumference (boundary) of the cladding.

In general, in designing the multi-core optical fiber, the bending loss is increased and a propagation loss is increased when the core is arranged on the outer side of the cladding, and thus, it is necessary to design an appropriate cladding thickness. Referring to FIG. 2, in a case where there is no common trench (the multi-core optical fiber 50 in FIG. 1(*a*)), the cladding thickness of about 50 μm is required to make the bending loss negligibly small (for example, $10^{-3}$ dB/km).

On the other hand, since the multi-core optical fiber 51 of the present embodiment includes the common trench, the required cladding thickness can be 41 μm and the bending loss can be $10^{-3}$ dB/km. That is, the common trench is provided, which makes it possible to design the multi-core optical fiber having a smaller cladding diameter than that of the conventional multi-core optical fiber, and to increase the thickness of the cladding, and as a result, mechanical reliability is improved. In addition, in a case where the cladding diameter is the same as that of the conventional multi-core optical fiber, the common trench is provided, which makes it possible to increase a core density and arrange more cores than those in the conventional multi-core optical fiber.

In designing the common trench, C, W, and $\Delta_-$ are parameters, but in designing an optical characteristic, a trench volume x, which is a product of an area of the common trench and $\Delta_-$, is used as a parameter.

Figure 3:
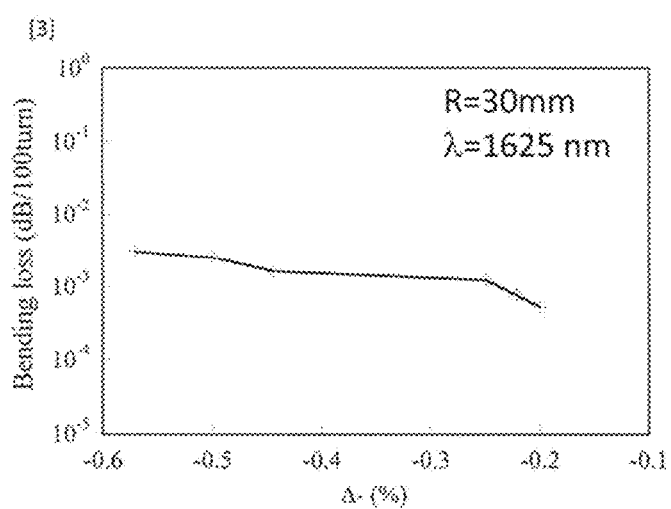
FIG. 3 is a diagram for describing a characteristic of the multi-core optical fiber according to the present invention.

FIG. 3 illustrates a result of calculation of the bending loss when the trench volume x is constant (1257 μm²%) and C, W, and $\Delta_-$ are changed. C is changed in a range of 30 to 40 μm, and W is changed in a range of 10 to 20 μm. Note that the core has a structure in which a=4.5 μm and $\Delta_+$=0.3%. The wavelength is 1625 nm, and the bending radius is 30 mm.

It can be seen from the result that even when C, W, and $\Delta_-$ are changed, the bending loss characteristic is substantially constant as long as the trench volume x is constant. That is, an effect of improving the bending loss by the common trench can be estimated using the trench volume x.

Figure 4:
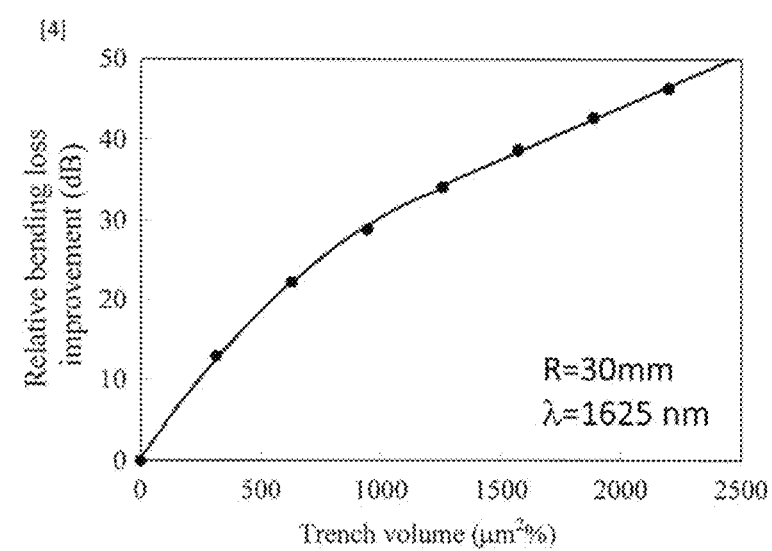
FIG. 4 is a diagram for describing a characteristic of the multi-core optical fiber according to the present invention.

FIG. 4 is a diagram for describing a result of calculation of the effect of improving the bending loss with respect to the trench volume x. The bending loss improvement effect indicates a reduction from the bending loss calculated with the core alone in a case where the common trench is provided, and for example, the improvement effect of 10 dB in FIG. 4 indicates that the bending loss becomes 1/10 times in a case where the common trench is provided. As illustrated in FIG. 4, the bending loss improvement effect with respect to the trench volume x is as follows:

[Formula 1]

$$\Delta\alpha_B = 0.043771x - 1.3385 \times 10^{-5}x^2 \text{ (When } x<1250 \text{ μm}^2\text{%)}$$

$$\Delta\alpha_B = 18.114 + 0.012932x \text{ (When } x \geq 1250 \text{ μm}^2\text{%)} \quad (1)$$

(the above formula is indicated by a solid line in FIG. 4).

The improvement of the bending loss characteristic by the provision of the common trench acts not only on a propagating fundamental mode but also on a higher-order mode. In a case of a design in which each core is operated in a single mode, as a condition, a higher-order mode does not propagate in a desired communication wavelength band, but it is necessary to perform designing in consideration of an increase in cutoff wavelength due to the provision of the common trench.

Figure 5:
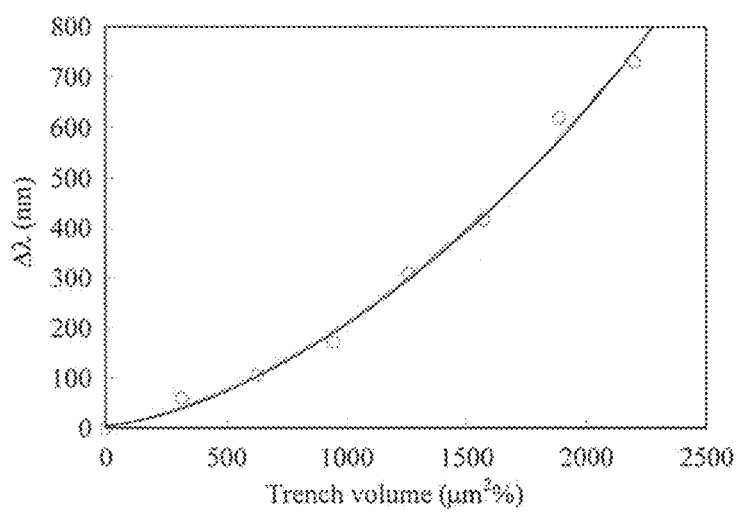
FIG. 5 is a diagram for describing a characteristic of the multi-core optical fiber according to the present invention.

FIG. 5 is a diagram for describing a result of calculation of changes in trench volume x and cutoff wavelength under the same condition as that of the calculation in FIG. 4. Note that DA on a vertical axis indicates an increase in cutoff wavelength due to the provision of the trench with respect to the cutoff wavelength λ of the core alone. As illustrated in FIG. 5, when the trench volume x is increased, the cutoff wavelength is increased to satisfy a relationship expressed by:

[Formula 2]

$$\Delta\lambda = 0.10453x - 0.00010793x^2 \quad (2)$$

Note that the above formula is indicated by a solid line in FIG. 5.

In addition to the bending loss and the cutoff wavelength, a mode field diameter (MFD) is also an important parameter related to a connection loss and a nonlinear characteristic in the optical fiber communication. Therefore, a change in MFD due to the common trench is calculated.

Figure 6:
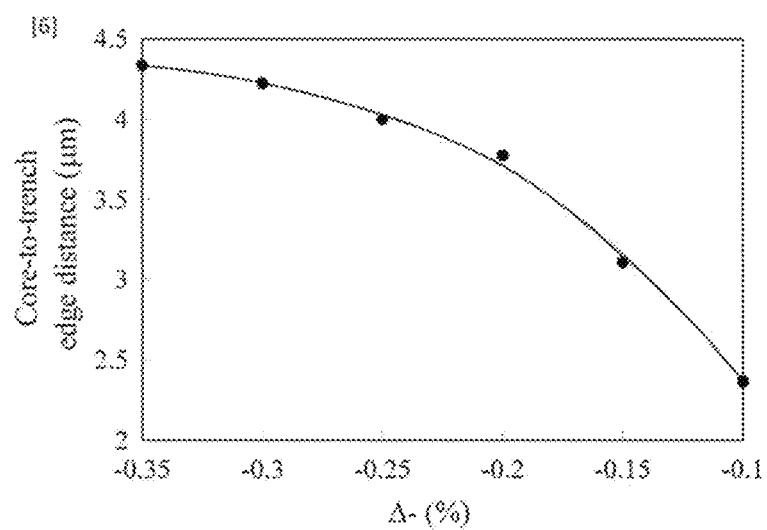
FIG. 6 is a diagram for describing a characteristic of the multi-core optical fiber according to the present invention.

Here, "E" is defined as a core-common trench distance indicating a minimum value between a boundary of the core and an inner diameter boundary of the common trench. "E" when the relative index difference $\Delta_-$ of the common trench is changed is indicated by a solid line in FIG. 6. Then, in FIG. 6, the upper right region of the solid line is a region in which the change in MFD (the amount of change in MFD of the core of the multi-core optical fiber of the present embodiment with respect to the MFD of the core of the conventional multi-core optical fiber) due to the provision of the common trench is less than 1%.

That is,

[Formula 3]

$$E > -0.35542 - 35.576\Delta_- - 93.643\Delta_-^2 - 86.407\Delta_-^3 \quad (3)$$

then, the change in MFD due to the provision of the common trench can be 1% or less, and the change in MFD can be almost ignored in terms of transmission characteristics.

Embodiment 2

Next, dependence of the effect of the common trench on the core structure is confirmed.

Figure 7:
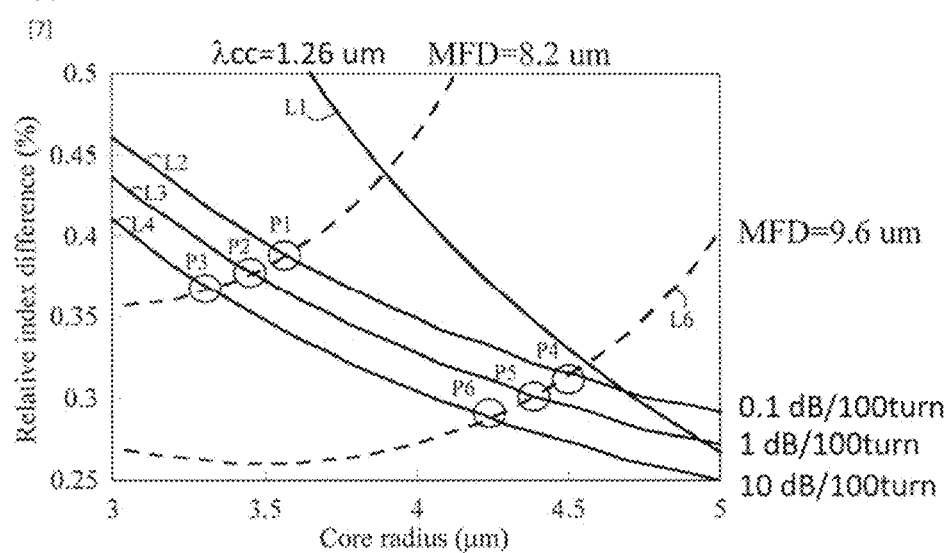
FIG. 7 is a diagram for describing a relationship between a core radius and the relative index difference satisfying a desired bending loss and the cutoff wavelength in a single-mode optical fiber.

FIG. 7 is a diagram illustrating a structural region of the core in which the cutoff wavelength is 1260 nm (curve L1), structural regions of the core in which the bending loss is 0.1 dB/100 turns (curve L2), 1 dB/100 turns (curve L3), and 10 dB/100 turns (curve L4), and structural regions of the core in which the MFD is 8.2 μm (curve L5) and 9.6 μm (curve L6) with respect to a core radius a and the relative index difference $\Delta_+$. Note that in G.652.D standard (see Non Patent Literature 8) which is a general single mode fiber (SMF) recommendation in ITU-T, the cutoff wavelength is 1260 nm, the bending loss is 0.1 dB/100 turns, and the MFD is 8.2 μm to 9.6 μm. In FIG. 7, the conditions of 1 dB/100 turns and 10 dB/100 turns are also described in consideration of the improvement of the bending loss due to the provision of the common trench. The structural region of the core surrounded by the desired curves (L1 to L6) is usually a design range in the general SMF.

For example, in a case of implementing optical characteristics conforming to the G.652 standard, the cutoff wavelength is increased by the common trench, and thus, it is necessary to consider a core structure having a high bending loss instead of providing the common trench to the core structure having the cutoff wavelength of 1260 nm. Here, it is sufficient to consider three types of structures in each of a design (L5) having the smallest MFD and a design (L6) having a large MFD under three bending loss design conditions (L2 to L4). The effect of improving the bending loss by the provision of the common trench is calculated for the six types of core structures of points (P1 to P6) illustrated in FIG. 7.

Figure 8:
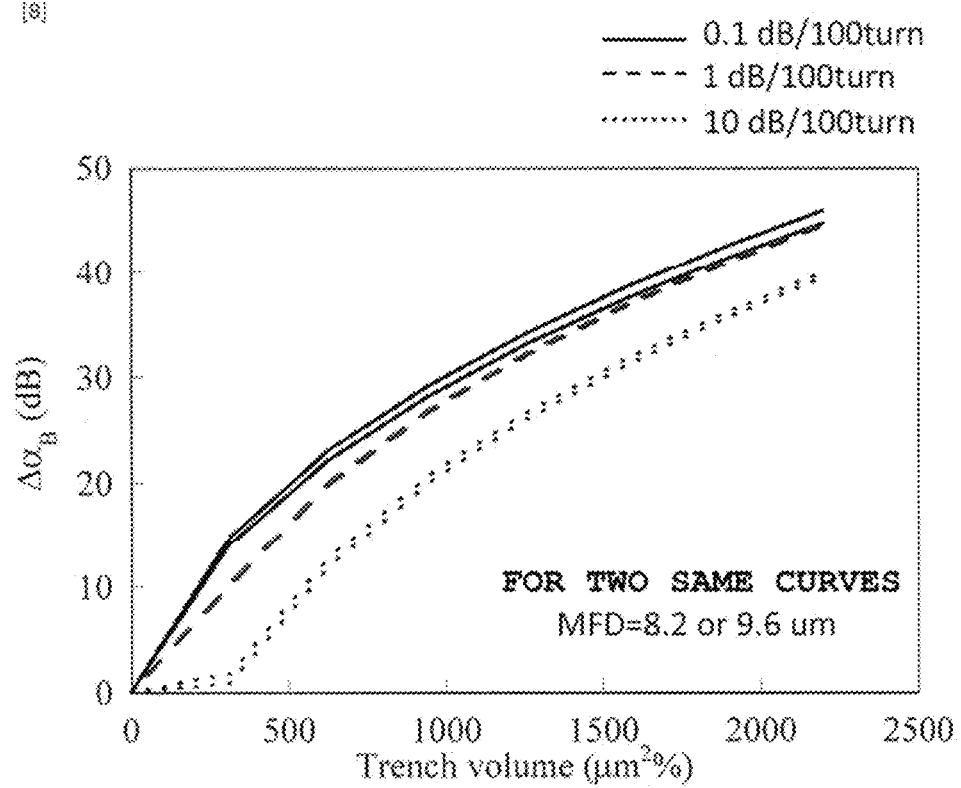
FIG. 8 is a diagram for describing a characteristic of the multi-core optical fiber according to the present invention.

FIG. 8 is a diagram illustrating a bending loss improvement amount $\Delta\alpha_B$ with respect to the trench volume x. FIG. 8 shows the following.
(a) The bending loss improvement amount Das is changed depending on the core structure.
(b) In the core structure having the same bending loss characteristic, the bending loss improvement amount $\Delta\alpha_B$ is substantially the same regardless of the MFD.
(c) A curve shape indicating a relationship between the trench volume x and the bending loss improvement amount $\Delta\alpha_B$ is substantially the same in any core structure, and only an intercept is changed.

Figure 9:
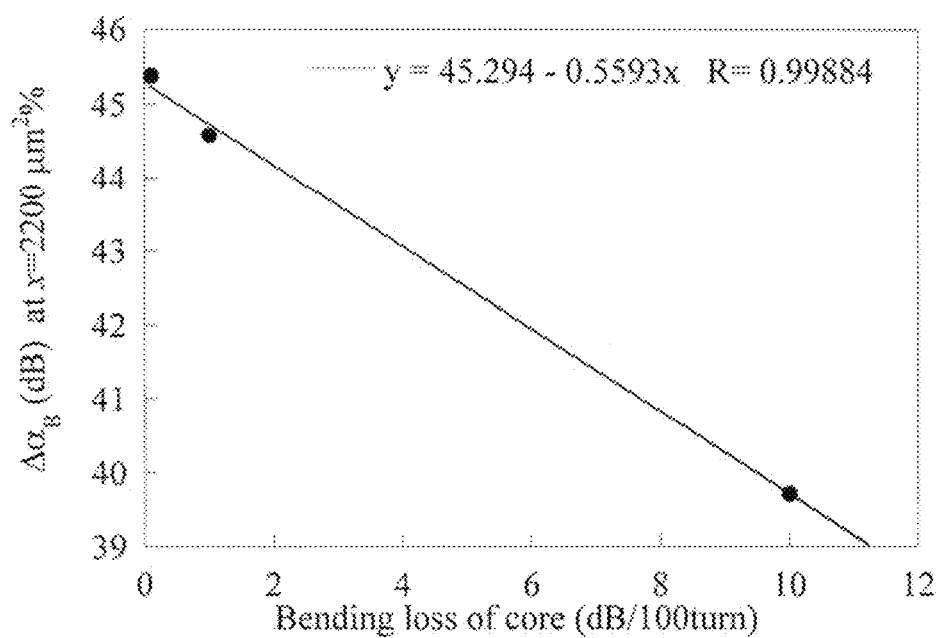
FIG. 9 is a diagram for describing a characteristic of the multi-core optical fiber according to the present invention.

FIG. 9 is a diagram illustrating dependence of the bending loss improvement amount Das on the core structure when the trench volume x is 2200 μm²%. A horizontal axis represents a bending loss (a bending loss of the core of the conventional multi-core optical fiber) as when the core exists alone. A vertical axis represents the bending loss improvement amount Das. The dependence of the bending loss improvement amount as on the core structure (the core structure for the bending loss) can be expressed by:

[Formula 4]

$$b = 45.3 - 0.56\alpha_B \quad (4)$$

That is, the bending loss improvement amount Das due to the provision of the common trench is obtained by adding an intercept of Formula (4) to Formula (1), and can be estimated by using:

[Formula 5]

$$\Delta\alpha_B = 0.043771x - 1.3385 \times 10^{-5}x^2 + b \text{ (When } x < 1250 \text{ μm}^2\%)$$

$$\Delta\alpha_B = 18.114 + 0.012932x + b \text{ (When } x \geq 1250 \text{ μm}^2\%)$$

$$b = 45.3 - 0.56\alpha_B \quad (5)$$

Figure 10:
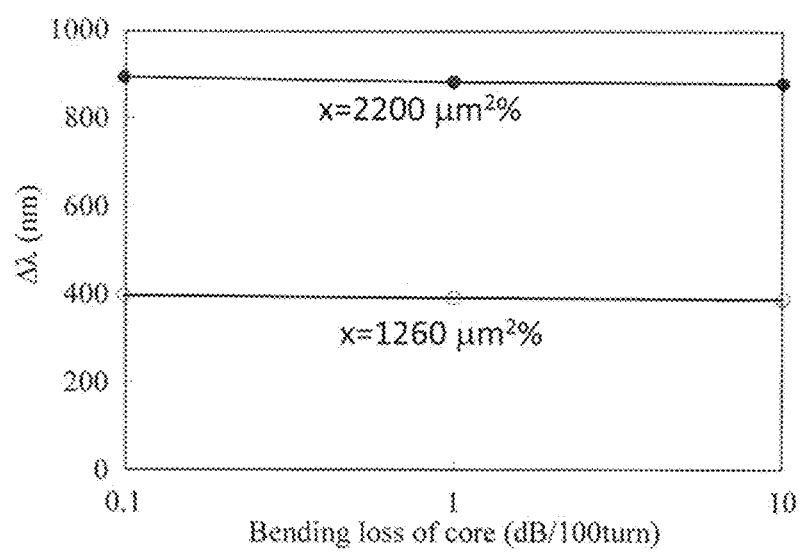
FIG. 10 is a diagram for describing a characteristic of the multi-core optical fiber according to the present invention.

FIG. 10 is a diagram for describing a change in cutoff wavelength under the same conditions as in FIG. 9. Here, the trench volume is 1260 or 2200 μm²%. Unlike the dependence of the bending loss improvement amount on the core of FIG. 9, the change in cutoff wavelength depends only on the trench volume x regardless of the value of the bending loss of the core alone.

That is, in a case where the structure of the core has the bending loss $\alpha_B$ and the cutoff wavelength of $\lambda_{cc}$ when it is assumed that the core exists alone, in order to obtain a desired target bending loss value $\alpha_{B0}$ and the cutoff wavelength $\lambda_{cc0}$, it is sufficient that the trench volume x is set to satisfy:

[Formula 6]

$$\alpha_B \times 10^{\frac{\Delta\alpha_B}{10}} < \alpha_B 0$$

$$\lambda_{cc} + \Delta\lambda + \lambda_{cc0}$$

$$\Delta\alpha_B = 0.043771x - 1.3385 \times 10^{-5}x^2 + b \quad \text{(When } x < 1250 \text{ μm}^2\%) \quad (6)$$

$$\Delta\alpha_B = 18.114 + 0.012932x + b \quad \text{(When } x \geq 1250 \text{ μm}^2\%)$$

$$\Delta\lambda = 0.10453x - 0.00010793x^2$$

$$b = 45.3 - 0.56\alpha_B$$

For example, in order to obtain characteristics equivalent to those of the general SMF, it is sufficient that $\alpha_{B0} < 0.1$ dB/100 turns and $\lambda_{cc0} < 1260$ nm when the bending radius is 30 mm.

INDUSTRIAL APPLICABILITY

The present invention can be used as a transmission medium in an optical transmission system.

REFERENCE SIGNS LIST

11 Core
12 Cladding
13 Common trench
50, 51 Multi-core optical fiber

The invention claimed is:

1. A multi-core optical fiber comprising:
a ring-shaped common trench having a refractive index lower than a refractive index of a cladding and surrounding all cores in a cross section,
wherein a minimum distance E (μm) from a boundary between the cores and the cladding to an inner diameter of the common trench satisfies Formula C1:

[Formula C1]

$$E > -0.35542 - 35.576\Delta_- - 93.643\Delta_-^2 - 86.407\Delta_-^3 \quad (C1)$$

where $\Delta_-$ is a relative index difference (%) of the common trench with respect to the cladding, a radius of the core is 4.5 μm and a relative index difference of the core with respect to the cladding is 0.3% at a wavelength of 1625 nm;
wherein the common trench has an inner diameter C (μm) and a ring width W (μm) that satisfy Formula C2:

[Formula C2]

$$\alpha_B \times 10^{-\frac{\Delta_{\alpha_B}}{10}} < \alpha_{B0} \quad (C2)$$
$$\lambda_{cc} + \Delta\lambda < \lambda_{cc0}$$
$$\Delta_{\alpha_B} = 0.043771x - 1.3385 \times 10^{-5}x^2 + b \quad (\text{When } x < 1250 \ \mu m^2\%)$$
$$\Delta_{\alpha_B} = 18.114 + 0.012932x + b \quad (\text{When } x \geq 1250 \ \mu m^2\%)$$
$$\Delta\lambda = 0.010453x + 0.00010793x^2$$
$$b = 45.3 - 0.56\alpha_B$$

where x (μm²%) is a product of an area of the common trench in the cross section of the multi-core optical fiber and an absolute value $\Delta_-$ of the relative index difference of the common trench,
$\alpha_{B0}$ is a desired bending loss (dB/100 turns) of the core,
$\lambda_{cc0}$ is a desired cutoff wavelength (nm) of the core,
$\alpha_B$ is a bending loss (dB/100 turns) of the core in a case where there is no common trench, and
$\lambda_{cc}$ is a desired cutoff wavelength (nm) of the core in a case where there is no common trench.

2. A design method of a multi-core optical fiber, wherein the multi-core optical fiber includes a ring-shaped common trench having a refractive index lower than a refractive index of a cladding and surrounding all cores in a cross section, and
a minimum distance E (μm) from a boundary between the cores and the cladding to an inner diameter of the common trench is designed to satisfy Formula C1:

[Formula C1]

$$E > -0.35542 - 35.576\Delta_- - 93.643\Delta_-^2 - 86.407\Delta_-^3 \quad (C1)$$

where $\Delta_-$ is a relative index difference (%) of the common trench with respect to the cladding, a radius of the core is 4.5 μm and a relative index difference of the core with respect to the cladding is 0.3% at a wavelength of 1625 nm;
wherein an inner diameter C (μm) and a ring width W (μm) of the common trench are designed to satisfy Formula C2:

[Formula C2]

$$\alpha_B \times 10^{-\frac{\Delta_{\alpha_B}}{10}} < \alpha_{B0} \quad (C2)$$
$$\lambda_{cc} + \Delta\lambda < \lambda_{cc0}$$
$$\Delta_{\alpha_B} = 0.043771x - 1.3385 \times 10^{-5}x^2 + b \quad (\text{When } x < 1250 \ \mu m^2\%)$$
$$\Delta_{\alpha_B} = 18.114 + 0.012932x + b \quad (\text{When } x \geq 1250 \ \mu m^2\%)$$
$$\Delta\lambda = 0.010453x + 0.00010793x^2$$
$$b = 45.3 - 0.56\alpha_B$$

where x (μm²%) is a product of an area of the common trench in the cross section of the multi-core optical fiber and an absolute value $\Delta_-$ of the relative index difference of the common trench,
$\alpha_{B0}$ is a desired bending loss (dB/100 turns) of the core,
$\lambda_{cc0}$ is a desired cutoff wavelength (nm) of the core,
$\alpha_B$ is a bending loss (dB/100 turns) of the core in a case where there is no common trench, and
$\lambda_{cc}$ is a desired cutoff wavelength (nm) of the core in a case where there is no common trench.

* * * * *